United States Patent
Turpin, Jr.

(10) Patent No.: US 10,358,387 B2
(45) Date of Patent: Jul. 23, 2019

(54) CONCRETE FIRE LOGS AND REFRACTORY MATERIALS

(71) Applicant: EVERBURN MANUFACTURING, INC., Lexington, KY (US)

(72) Inventor: Raymond C. Turpin, Jr., Atlanta, GA (US)

(73) Assignee: EVERBURN MANUFACTURING, INC., Lexington, KY (US)

( * ) Notice: Subject to any disclaimer, the term of this patent is extended or adjusted under 35 U.S.C. 154(b) by 239 days.

(21) Appl. No.: 15/284,991

(22) Filed: Oct. 4, 2016

(65) Prior Publication Data

US 2017/0096367 A1 Apr. 6, 2017

Related U.S. Application Data

(60) Provisional application No. 62/237,064, filed on Oct. 5, 2015.

(51) Int. Cl.
*C04B 24/04* (2006.01)
*C04B 28/02* (2006.01)
(Continued)

(52) U.S. Cl.
CPC ............ *C04B 24/04* (2013.01); *C04B 28/021* (2013.01); *C04B 40/0658* (2013.01);
(Continued)

(58) Field of Classification Search
CPC .. C04B 2103/0094; B28B 5/025; B29C 33/56
(Continued)

(56) References Cited

U.S. PATENT DOCUMENTS

| 4,047,962 A | 9/1977 | Copeland |
| 4,656,084 A * | 4/1987 | McCoy ................... C03C 25/26 252/8.83 |

(Continued)

FOREIGN PATENT DOCUMENTS

GB  1476126  10/1977

OTHER PUBLICATIONS

"Use of Water Reducers, Retarders, and Superplasticizers"<https://www.engr.psu.edu/ce/courses/ce584/concrete/library/materials/Admixture/AdmixturesMain.htm> Available Jul. 18, 2007. (Year: 2007).*

(Continued)

*Primary Examiner* — Matthew J Daniels
*Assistant Examiner* — Hana C Page
(74) *Attorney, Agent, or Firm* — Workman Nydegger

(57) ABSTRACT

A refractory composition is formed by preparing a set retarded fresh cementitious composition formed from a class C fly ash, a set retardant such as boric acid, and an alkali activator such as an alkali metal citrate salt, and contacting the set-retarded fresh cementitious composition with a pH regulator, such as an alkali metal hydroxide or alkali metal carbonate. The set retarded mixture provides workability and avoids equipment fouling caused by premature setting, while the alkali activator provides rapid setting when desired. The cementitious composition is shaped into a brick, panel, slab, concrete fire log, or the like and allowed to harden. The hardened cementitious composition can be heated to form a dried cementitious composition, and further heated to produce a high strength refractory composition. Fibers and/or aggregates may be included.

21 Claims, 1 Drawing Sheet

(51) Int. Cl.
  *C04B 40/06* (2006.01)
  *B28B 1/20* (2006.01)
  *C04B 103/12* (2006.01)
  *C04B 103/22* (2006.01)
  *C04B 111/28* (2006.01)
  *C04B 103/00* (2006.01)
  *C04B 103/10* (2006.01)
  *C04B 111/00* (2006.01)

(52) U.S. Cl.
  CPC ............ *C04B 40/0691* (2013.01); *B28B 1/20* (2013.01); *C04B 2103/0094* (2013.01); *C04B 2103/10* (2013.01); *C04B 2103/12* (2013.01); *C04B 2103/22* (2013.01); *C04B 2111/00431* (2013.01); *C04B 2111/00965* (2013.01); *C04B 2111/28* (2013.01)

(58) Field of Classification Search
  USPC ........................................................ 264/333
  See application file for complete search history.

(56) References Cited

U.S. PATENT DOCUMENTS

| | | |
|---|---|---|
| 4,997,484 A | 3/1991 | Gravitt et al. |
| 5,026,579 A | 6/1991 | Thow |
| 5,284,686 A | 2/1994 | Thow |
| 6,827,776 B1 | 2/2004 | Boggs et al. |
| 7,223,095 B1 * | 5/2007 | Corry ................ F24C 3/006 126/512 |
| 7,288,148 B2 | 10/2007 | Hicks et al. |
| 8,333,812 B2 | 12/2012 | Fischer |
| 8,551,241 B2 | 10/2013 | Perez-Pena |
| 8,795,428 B1 | 8/2014 | Hill et al. |
| 9,090,506 B2 | 7/2015 | Perez-Pena |
| 9,352,495 B1 * | 5/2016 | Parks ................ C10M 173/00 |
| 2007/0245667 A1 | 10/2007 | Clegg |
| 2012/0031306 A1 * | 2/2012 | Belden ................ B28B 5/025 106/705 |
| 2012/0172469 A1 * | 7/2012 | Perez-Pena .......... C04B 28/021 521/83 |
| 2013/0284070 A1 | 10/2013 | Dubey |
| 2014/0264140 A1 | 9/2014 | Gong et al. |
| 2017/0081516 A1 * | 3/2017 | Yoo ..................... C03C 25/10 |

OTHER PUBLICATIONS

A.J. Majumbar. "The role of the interface in glass fibre reinforced cement." Cement and Concrete Research. vol. 4, Issue 2, Mar. 1974, pp. 247-268 Accepted Dec. 27, 1973, Available online Jan. 27, 2003. (Year: 1973).*

Abdullah et al. "Fly Ash-based Geopolymer Lightweight Concrete Using Foaming Agent" Int. J. Mol. Sci. 2012, 13(6), 7186-7198.

Hossain et al. "Fire Resistance of Cement Mortar Containing High Volume Fly Ash" *31st Conference on our world in concrete & structures*: Aug. 16-17, 2006, Singapore http://www.cipremier.com/e107_files/downloads/Papers/100/31/100031022.pdf.

* cited by examiner

CONCRETE FIRE LOGS AND REFRACTORY MATERIALS

CROSS-REFERENCE TO RELATED APPLICATIONS

This Application claims the benefit of U.S. Provisional Patent Application No. 62/237,064, filed Oct. 5, 2015, the disclosure of which is incorporated herein in its entirety.

BACKGROUND

Traditional Portland cement binders used in concrete form a calcium silicate hydrate (CSH) structure that begins to break down when exposed to high temperatures. Traditional concrete mixtures composed of aggregate, water, and Portland cement are typically limited to service temperatures of 100° C. or less. Higher temperatures result in desiccation of the cement binder structure, leading to reduced volume, internal stresses, strength loss, and related failures. For example, temperatures above 800° C. can produce strength losses of at least 75% in traditional concretes. In addition, subsequent cooling from these high temperatures results in large increases in shrinkage and integrity loss due to reduced volume of the cement binder.

For high temperature applications, various formulations utilizing refractory cements containing enhanced alumina contents and expansion-resistant aggregate fillers are used. Compared to Portland cement, refractory cement binders are substantially more expensive and are only used for special high temperature applications. However, Portland cement is unsuitable for high temperature applications because of degradation.

For example, Portland cement concrete is not typically used to manufacture decorative fire logs used in gas fireplaces. Instead, a ceramic material is typically used. In general, artificial fire logs are used in many gas or propane fireplaces as inserts designed to resemble real wooden logs. Artificial fire logs are typically formed from ceramic fiber materials.

Accordingly, there is an ongoing need for improved refractory materials and refractory material production processes, including concrete fire logs and processes for producing concrete fire logs.

SUMMARY

Disclosed herein are refractory compositions and methods for producing refractory compositions. In some embodiments, the refractory compositions can be in the form of bricks, blocks, slabs, panels, and/or other building units configured for use in constructing a refractory structure, such as a furnace, kiln, incinerator, oven, boiler, stove, or the like. In some embodiments, the refractory compositions are in the form of concrete fire logs configured in size and shape to resemble wooden logs. The concrete fire logs can be further configured for use in a natural gas, propane, or other hydrocarbon fuel fireplace.

In some embodiments, a high temperature refractory composition is formed by: (1) preparing a fresh cementitious composition including Class C fly ash, an alkali activator, and water; (2) shaping the fresh cementitious composition; (3) allowing the cementitious composition to harden; (4) heating the hardened cementitious composition to remove water and form a dried cementitious composition; and (5) further heating the dried cementitious composition to form the refractory composition. The cementitious and/or refractory compositions may include at least one of fibers or aggregates.

In some embodiments, a refractory composition is further formed by: (6) adding a set retardant to the fresh cementitious composition to retard setting; and (7) thereafter adding a pH regulator to accelerate setting.

In some embodiments, one or more types of reinforcing fibers can be included to increase the tensile strength, flexural strength and/or toughness of the refractory composition. Examples include polymer, glass, ceramic or metal fibers.

In some embodiments, one or more types of aggregates may be included to add bulk and/or strength.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only illustrated embodiments of the disclosure and are therefore not to be considered limiting of its scope. Embodiments of the disclosure will be described and explained with additional specificity and detail through the use of the accompanying drawings in which.

DETAILED DESCRIPTION

Figure 1:
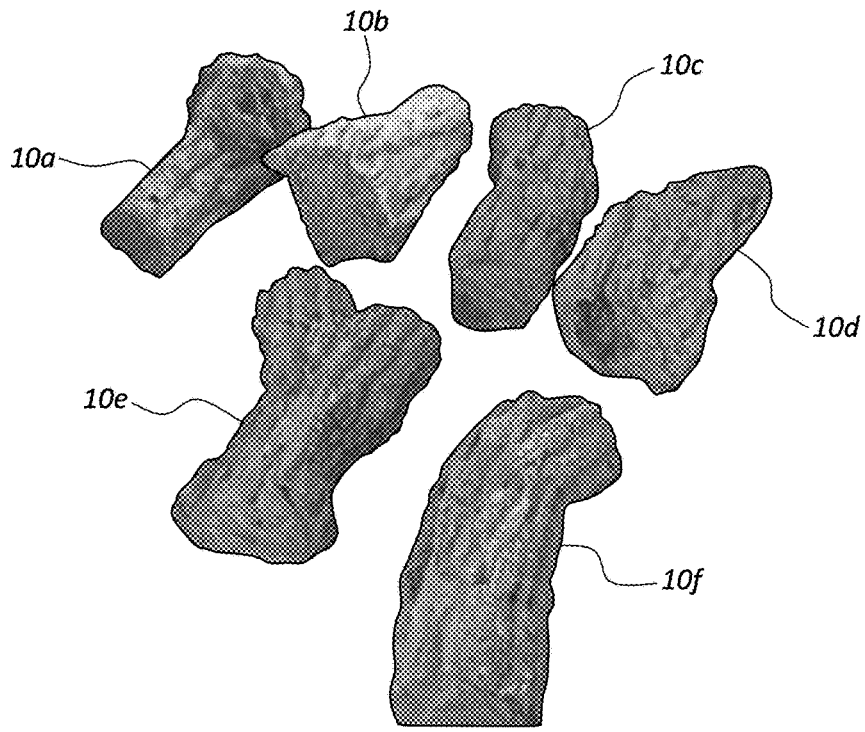
FIG. 1 illustrates a refractory composition in the shape of concrete fire logs formed according to the present disclosure.

The present disclosure describes cementitious compositions and methods for producing refractory compositions therefrom. Refractory compositions include cementitious compositions and refractory materials (including concrete fire logs). In some embodiments, a cementitious composition includes water, a refractory cementitious binder, optionally an aggregate, and optionally reinforcing fibers. In some embodiments, a refractory composition includes a hardened refractory cementitious binder and an aggregate bonded by the refractory cementitious binder.

In some embodiments, a method of forming a high temperature refractory composition comprises: (1) preparing a fresh cementitious composition including Class C fly ash, an alkali activator, and water; (2) shaping the fresh cementitious composition; (3) causing or allowing the cementitious composition to harden; (4) heating the hardened cementitious composition to remove water and form a dried cementitious composition; and (5) further heating the dried cementitious composition to form the refractory composition.

I. Cementitious Compositions

In some embodiments, a fresh cementitious composition includes a Class C fly ash material, an alkali activator, and water. In some embodiments, a fresh cementitious composition additionally includes a set retardant. In some embodiments, a fresh cementitious composition additionally includes an aggregate.

In preferred embodiments, the fly ash material includes an amount of lime sufficient to provide cementing properties to the fly ash in the presence of water without requiring additional cementing agents. For example, the fly ash material may include more than 5%, more than 10%, more than 15%, more than 20%, more than 25%, more than 30%, more than 35%, or more than 40% by weight lime. Preferably, the cementitious composition omits Portland cement.

In some embodiments, the alkali activator is an alkali metal salt of a weak organic acid, such as a sodium citrate or potassium citrate. In some embodiments, the alkali enhancer is an alkali metal salt formed from an alkali metal cation and an acetate, citrate, lactate, glycolate, hydroxybutyrate, hydroxyvalerate, benzoate, fumerate, malate, or succinate anion. In some embodiments, a conjugate acid of the alkali metal activator has a pKa of about 2 to 6, or about 3 to 5.

In some embodiments, the alkali activator can improve workability of the cementitious composition. For example, an alkali metal citrate (e.g., sodium citrate or potassium citrate) or other salt can function as a plasticizer to improve workability of the cementitious composition for easier handling composition.

In some embodiments, the alkali activator and a set retardant can work in conjunction with one another to modulate and control the set time of the mixture. For example, the alkali activator and the set retardant can be added in relative amounts that enable the set time of the cementitious composition to be fine-tuned to a desired level. In some embodiments, the ratio of the set retardant to the alkali activator, by weight, ranges from about 0.05 to 20, about 0.25 to 15, about 0.5 to 10, about 0.75 to 5, about 1 to 2, or about 1.25 to 1.5.

In some embodiments, the set retardant is a weak organic acid or a weak mineral acid (e.g., having a pKa of about 3 to about 10). For example, the set retardant may be a citric acid, lactic acid, ascorbic acid, benzoic acid, oxalic acid, acetic acid, propionic acid, boric acid, or carbonic acid.

In some embodiments, the alkali enhancer is configured to prime or ready the composition for more rapid setting, but to have diminished effect (e.g., little or no effect) in the presence of the set retardant, and a pH regulator is configured to override the effects of the set retardant so as to bring about more rapid setting of the composition.

In some embodiments, the pH regulator is an alkali metal hydroxide, such as sodium hydroxide or potassium hydroxide. In some embodiments, the pH regulator is an alkali metal salt of a weak organic acid, such as an alkali metal ascorbate, alkali metal carbonate, or alkali metal phosphate. In some embodiments, the pH regulator is a combination of pH regulators described herein. In some embodiments, a conjugate acid of the pH regulator has a pKa of about 8 to 16, or about 8.5 to 14, or about 9 to 12, or about 9.5 to 10.5.

In preferred embodiments, the alkali activator is an alkali salt of a weak organic acid (e.g., sodium citrate or potassium citrate), the set retardant is boric acid, and the pH regulator is an alkali metal (e.g., sodium or potassium) carbonate or hydroxide.

In some embodiments, the alkali activator is included in an amount of about 0.1 to 10%, or about 0.5 to 7%, or about 1 to 4% by fly ash weight. In some embodiments, the set retardant is included in an amount of about 0.1 to 5%, or about 0.5 to 2%, or about 1 to 1.5% by fly ash weight. In some embodiments, the pH regulator is included in an amount of about 0.1 to 5%, or about 0.5 to 2%, or about 0.75 to 1.25% by fly ash weight.

In some embodiments, cementitious compositions used to make refractory compositions can include one or more aggregates, such as aggregates that can tolerate high heat exposure. Examples of aggregates that may be included in the cementitious and/or refractory compositions include, but are not limited to, pumice, shale, lightweight expanded shale, perlite, vermiculite, crushed stone, sand, basalt, metallurgical slag, and the like.

The cementitious compositions used to make refractory compositions may optionally include one or more types of fibers. In some embodiments, the cementitious composition may include a polymer fiber configured to melt during heating of the cementitious composition and thereby leave a plurality of voids within the cementitious composition. Such voids can provide pathways to vent water vapor from the molded composition. Exemplary polymer fibers include, but are not limited to, at least one of polyester, polyethylene, polyvinyl chloride, polypropylene, polystyrene, polyamide, polycarbonate, polyurethane, acrylonitrile butadiene styrene (ABS), cellulose acetate, polyoxymethylene, polymethyl methacrylate, polysulfone, styrene acrylonitrile, or combination of these and/or other polymers.

In some embodiments, the polymer fiber can be configured to melt at a temperature below which the build-up of water vapor within the composition causes disruptive, explosive spalling. For example, the polymer fiber may be formed from a polymer having a melting point of about 75° C. to about 270° C., or about 100° C. to about 250° C., or about 125° C. to about 225° C., or about 150° C. to about 200° C.

In some embodiments, the cementitious composition can include high strength reinforcing fibers, such as glass fibers or steel fibers configured to aid in maintaining the shape and structure of a resulting refractory composition. For example, a cementitious composition used to form a refractory composition in the shape of a hollow fire log can include an amount of reinforcing fiber in order to provide additional structural support to the fire log.

In some embodiments, it may be desirable to use alkali-resistant glass fibers so that they will not completely dissolve when exposed to highly alkaline conditions typically present in the cementitious composition and resulting refractory composition. Alkali-resistant fibers are not an absolute requirement, however. Examples of suitable glass fibers include zirconia-treated fibers (e.g., Nycon AR-HD fibers). It has been observed that even alkali treated fibers can partially dissolve when exposed to the high alkali, high temperature conditions to which the cementitious compositions are exposed. Such partial but incomplete dissolution can be beneficial from two standpoints: (1) partial dissolution can provide void spaces or pathways that permit venting of moisture when heating and/or during the service life of the refractory composition; and (2) the remaining undissolved glass fibers have high temperature resistance, can continue contributing strength and toughness to the refractory composition, and can provide a desirable reddish glow when the refractory composition (e.g., fire log) is heated during operation, which provides a more realistic look as a burning log.

II. Formation of Hardened Cementitious Compositions

In some embodiments, a method of forming a high temperature refractory composition includes: (1) preparing a fresh cementitious composition including Class C fly ash, an alkali activator, and water; (2) shaping the fresh cementitious composition; (3) allowing the cementitious composition to harden; (4) heating the hardened cementitious composition to remove water and form a dried cementitious composition; and (5) further heating the dried cementitious composition to form the refractory composition. The cementitious and/or refractory compositions may optionally include at least one of fibers or aggregates.

In some embodiments, a method of forming a refractory composition further includes: (6) adding a set retardant to the fresh cementitious composition to retard setting; and (7) thereafter adding a pH regulator to accelerate setting.

A set-retarded cementitious composition has an extended set time that allows a large amount of the set-retarded cementitious composition to be mixed in a given batch. For example, rather than mixing frequent, smaller batches in order to avoid premature setting prior to subsequent processing (e.g., pouring into molds), the extended set time of the set-retarded cementitious mixture allows larger batches to be mixed and excess portions to be set aside until subsequent processing is available (e.g., until molds become available). Advantageously, this can lower the required number of mixing operations, reduce the amount of mixing equipment needed, and can increase the efficiency of a refractory composition production process by enabling greater efficiencies of scale (e.g., greater efficiency is possible in mixing larger batches than in mixing a number of smaller and more frequent batches).

In some embodiments, a set-retarded mixture has an extended set time that allows for pouring and other handling of the mixture (e.g., prior to the setting process progressing to a point that prevents pouring and handling) for a period of up to about 3 hours, or up to about 2.5 hours, or up to about 2 hours, or up to about 1.5 hours, or up to about 1 hour, or up to about 45 minutes, or up to about 30 minutes.

In some embodiments, a set-retarded mixture is contacted with a pH regulator prior to further processing of the aliquot. For example, an aliquot of the set-retarded mixture can be removed and mixed with the pH regulator to trigger rapid setting of the aliquot. The aliquot can then be placed in a mold or otherwise formed into a desired shape and allowed to set.

In some embodiments, a set-retarded mixture is contacted with a pH regulator during a further processing step. For example, an aliquot of the set-retarded mixture can be removed and contacted with a surface (e.g., a mold such as a fire log mold) that has been pre-treated with the pH regulator. Upon contact with the surface, the set-retarded composition is activated and becomes rapid setting.

In another example, an aggregate (e.g., sand, shale, gravel, pumice, expanded mineral materials, and/or other aggregates known in the art) can be pre-treated with a pH regulator, and the set-retarded cementitious mixture can be activated upon contact with the aggregate. In some embodiments, the aggregate is pre-loaded into a mold and the set-retarded cementitious mixture is added to the mold. Such embodiments may additionally include a step of vibrating, shaking, rolling, or otherwise shifting the mold so as to aid in the permeation of the mixture throughout the aggregate prior to fully setting.

In some embodiments, a mold is rotated to provide a centrifuge effect and to position the cementitious composition poured within the mold along the inner surface of the mold. For example, a lightweight fire log having a hollow center can be formed by pouring an amount of a cementitious composition, measured to provide a desired log thickness, into the mold and rotating the mold along an axis that coincides with a length of the log. The rotation can cause the mixture to be positioned along the inner surface of the mold, at a thickness determined by the amount of material added, while leaving a hollow center.

In some embodiments, a reinforcing core is also added to the mold. The reinforcing core can be configured to prevent the passage of the cementitious composition through the reinforcing core (e.g., by sizing a mesh material to a size small enough to prevent the flow of fresh cementitious refractory material through the mesh) such that the cementitious composition is contained in the annular space between the reinforcing core and the inner surface of the mold.

In some embodiments, a cementitious composition sets (e.g., sufficient for removal from a mold) within about 2 to 45 minutes, or about 2.5 to 30 minutes, or about 3 to 15 minutes, or about 4 to 10 minutes. In some embodiments, the resulting hardened cementitious composition has a compressive strength of about 10,000 psi (70 MPa) at about 4 to 5 days after pouring without additional heating. In some embodiments, the refractory composition can have a compressive strength of about 5,000 psi (35 MPa) to 20,000 psi (140 MPa), or about 7,500 (50 MPa) to 15,000 psi (100 MPa) at about 4 to 5 days after pouring and without additional heating.

In some embodiments, a fresh cementitious composition generates heat during setting sufficient to raise the temperature of the composition by about 15° C. above ambient temperature. For example, the composition can reach a temperature of about 5° C. to 25° C., or about 7.5° C. to 22.5° C., or about 10° C. to 20° C., or about 12.5° C. to 17.5° C. above ambient temperature during setting. In some embodiments, the composition can reach a temperature of about 40° C. to 60° C., or about 45° C. to 55° C., or about 50° C.

Advantageously, this heat generation allows a substantial portion of the required drying of the cementitious composition to be accomplished while the material is setting up (e.g., inside a mold). The removal of sufficient moisture prior to further heating at high temperatures is necessary to avoid the build-up of internal water vapor pressures, which can cause dangerous and destructive explosive spalling. Beneficially, one or more of the processes described herein provide rapid drying of the cementitious composition after pouring, as the rapid setting and rapid heat generation initiate the drying process even while the refractory composition is setting up and/or still within a mold.

After hardening, the hardened cementitious composition is heated to about 150° C. to 260° C., or about 175° C. to 230° C., or about 205° C. in order to further promote drying of the refractory composition. The refractory composition is heated for a time sufficient to remove the moisture to a level that avoids explosive spalling in a high temperature environment (e.g., about 540° C. to 820° C. or more). The time period for heating is dependent on the size and shape of the refractory composition (e.g., surface area to volume ratio), the water to fly ash ratio of the mixture prior to pouring, and the addition or omission of plasticizers and/or other admixtures to the mixture, among other factors.

The hardened cementitious composition can be heated for a time period of about 30 minutes to 5 hours, or about 45 minutes to 3 hours, or about 1 to 2 hours. As described above, the composition is able to be rapidly dried to an appropriate level within a relatively short time period. This can significantly reduce production times and thus the throughput of a production process, and represents a significant improvement over the prior art. In some embodiments, the refractory composition has a compressive strength of about 4,000 (27 MPa) to 8,000 psi (51 MPA), or about 5,000 (35 MPa) to 7,000 psi (48 MPa), or about 6,000 psi (41 MPa) after the moisture-removal heating process.

In some embodiments, one or more types of fibers can be included to provide vent holes for release of water vapor during heating. Fibers may also increase the tensile strength, flexural strength and/or toughness of the refractory composition.

III. Formation of Refractory Compositions

One or more refractory compositions or products can be formed from the cementitious compositions described above. In some embodiments, the refractory composition is in the form of a brick, block, slab, panel, or the like configured for use in a high-temperature product or structure, such as a furnace, kiln, oven, incinerator, forge, boiler, stove, heater, etc. In some embodiments, the refractory composition is in the form of a concrete fire log configured for use as a decorative log resembling real wood and/or for use in a grill, fireplace, hearth, or other heating apparatus. Typically, such a heating apparatus is fueled by a liquid hydrocarbon fuel, such as propane or natural gas, which is ignited near and/or within the fire logs so as to give the appearance of burning wood.

In some embodiments, the refractory composition can be further heated (e.g., fired) to produce a high strength refractory composition. For example, a dried cementitious composition that has been sufficiently desiccated to allow safe heating to high temperatures can be heated to a temperature of about 540° C. to 820° C. or more (about 1,000° F. to 1,500° F. or more). Unexpectedly, the fired composition performs as a refractory ceramic by operating in such environments without suffering a loss of compressive strength.

In some embodiments, the composition can undergo an expansion after such further heating. For example, a cementitious composition that has been fired to form the high temperature and high strength refractory composition and has cooled back to ambient temperature can be expanded by about 0.01 to 0.08%, or about 0.02 to 0.06%, or about 0.03 to 0.05%, or about 0.04% relative to the dried cementitious composition prior to firing.

Resulting refractory compositions exhibit high strength. For example, a fire log that has been fired can be dropped onto a concrete floor from a distance of about 3 to 4 feet multiple times (e.g., ten or more) without breakage. A material exhibiting such resilience represents a significant improvement over the relatively fragile fire logs and other refractory compositions of the prior art.

In some embodiments, a refractory composition exhibits a reddish fire-like glow when heated to operational temperatures (e.g., about 400° C. to 1100° C.). In a fire log embodiment, this effect beneficially gives the appearance of real burning wood. Such glow can be enhanced by using glass fibers.

IV. Exemplary Fire Logs

FIG. 1 illustrates exemplary fire logs 10a, 10b, 10c, 10d, 10e and 10f formed using the compositions and methods described herein. As shown, the fire logs can be formed to give the appearance (e.g., texture, color, etc.) of real firewood. In some embodiments, a fire log has a density that is substantially uniform throughout the structure of the fire log. In other embodiments, the fire log has a non-uniform density. For example, in some embodiments, a lightweight fire log is formed with a hollow center and/or a center formed with a lightweight reinforcing core (e.g., a wire mesh material) as described herein.

Figure 2:
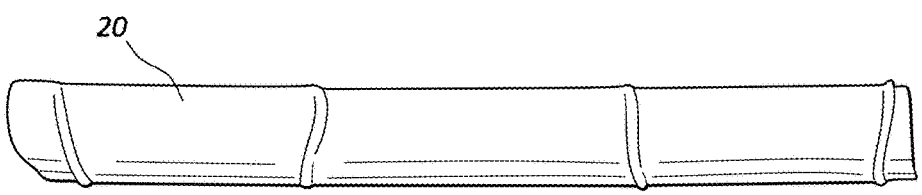
FIG. 2 illustrates a reinforcing core in the form of a hollow cylinder positionable within a refractory composition and configured to provide additional strength and controlled shrinkage to the refractory material.
Figure 3:
FIG. 3 illustrates a reinforcing core in the form of a rod positionable within a refractory composition and configured to provide additional strength and controlled shrinkage to the refractory material.

In some embodiments, a fire log can include a reinforcing core configured to provide strength to the fire log. FIGS. 2 and 3 illustrate exemplary embodiments of reinforcing cores. As shown, the reinforcing core can be formed as a cylinder 20 (FIG. 2), such as a mesh structure with a hollow center, or a rod 30 (FIG. 3). In other embodiments, the reinforcing core can be formed in other shapes, such as tapering shapes, helical shapes, curving shapes, segmented shapes, and/or other shapes. The reinforcing core may have a uniform or non-uniform cross section.

In some embodiments, the reinforcing core includes one or more compressible sections permitting controlled shrinkage of the refractory composition surrounding the reinforcing core during setting of the refractory composition. For example, the reinforcing core may be formed as a hollow cylinder formed of a mesh material (such as the illustrated cylinder). The reinforcing core provides strength to the structure of the fire log, while also allowing for structural compression during shrinkage of the refractory composition and/or during expansion of the metal of the reinforcing core.

In another example, the reinforcing core is formed as a metal rod having one or more compressible sections. As shown in the illustrated embodiment, the metal rod includes compressible end sections, which may be formed of aluminum foil and/or other compressible materials, providing for compression of the reinforcing core during shrinkage of the refractory composition and/or during expansion of the metal of the reinforcing core. The compressibility of the reinforcing core can advantageously reduce or eliminates the formation of stress fractures and consequent cracking of the fire log or other refractory composition.

Elements described in relation to any embodiment depicted and/or described herein may be combinable with elements described in relation to any other embodiment depicted and/or described herein. The present disclosure may be embodied in other specific forms without departing from its spirit or essential characteristics. The described embodiments are to be considered in all respects only as illustrative and not restrictive.

EXAMPLES

Example 1

A lightweight cementitious composition for use in making a lightweight refractory composition was prepared using the components in Table 1:

TABLE 1

|  | Specific Gravity | Weight (grams) | Solid Volume (cc) |
| --- | --- | --- | --- |
| C fly ash | 2.7 | 1000 | 370 |
| Expanded shale ⅜ inch to # 100 US sieve. | 1.78 | 900 | 506 |
| Expanded shale ⅜ to # 4 US sieve | 1.5 | 550 | 367 |
| Water | 1.0 | 260 | 260 |
| Sodium Citrate di-hydrate | n/a | 5-25 | n/a |
| Citric acid | n/a | 0-8 | n/a |
| Totals | n/a | approximately 2710 grams | 1503 cc |
| Pounds per cubic foot |  |  | 112.5 |
| Converted to lbs.& Ft³ |  | 2710 pounds | 24 cubic feet |
| Parts by weight |  | 1:0.9:0.55:0.26 |  |
| Parts by % weight |  | 37, 33, 20, 10 |  |
| Sodium citrate % C ash wt. | 0.5-2.5 | W/C = 0.26 |  |
| Citric acid % C ash wt. | 0-0.5 |  |  |

The molded composition had a compressive strength of 3,000 psi (20.7 MPa) after 30 minutes, of 6,000 psi (41.4 MPa) after 24 hours, and of 8,000 psi (55.2 MPa) after 1 hour of heating at 350° F. (177° C.). After 12 hours at 1,000° F. (538° C.) (until weight stability was attained), the composition had a compressive strength of 6,000 psi (41.4 MPa).

Example 2

A standard weight cementitious composition for use in making a standard weight refractory composition was prepared using the components in Table 2:

TABLE 2

|  | Specific Gravity | Weight (grams) | Solid Volume (cc) |
|---|---|---|---|
| C fly ash | 2.7 | 1000 | 370 |
| Quartz sand. | 2.65 | 1340 | 506 |
| Pea gravel | 2.65 | 550 | 207 |
| Water | 1.0 | 200 | 200 |
| Sodium Citrate di-hydrate | n/a | 5-25 | n/a |
| Citric acid | n/a | 0-8 | n/a |
| Totals | n/a | approximately 3090 grams | 1288 cc |
| Pounds per cubic foot |  |  | 148.7 |
| Converted to lbs.& Ft$^3$ |  | 3090 pounds | 20.6 cubic feet |
| Parts by weight |  | 1:0.9:0.55:0.20 |  |
| Parts by % weight |  | 32:43:18:6.5 |  |
| Sodium citrate % C ash wt. | 0.5-2.5 | W/C = 0.20 |  |
| Citric acid % C ash wt. | 0-0.5 |  |  |

The molded composition had a compressive strength of 3,000 psi (20.7 MPa) after 30 minutes, of 6,000 psi (41.4 MPa) after 24 hours, and of 8,000 psi (55.2 MPa) after 1 hour of heating at 350° F. (177° C.). After 12 hours at 1,000° F. (538° C.) (until weight stability was attained), the composition had a compressive strength of 6,000 psi (41.4 MPa).

Example 3

A lightweight cementitious composition for use in making a lightweight refractory composition was prepared using the components in Table 3:

TABLE 3

|  | Specific Gravity | Weight (lb.) |
|---|---|---|
| C fly ash | 2.7 | 100 |
| Lightweight expanded shale | 1.5-1.78 | 30 |
| Water | 1.0 | 25 |
| Zirconium treated glass fibers | 2.6 | 1.5 |
| Sodium Citrate di-hydrate | n/a | 4.0 |
| Boric acid | n/a | 0.5 |
| Total | n/a | 161 |

The molded composition had good compressive strength after curing and heating, with the glass fibers providing extra toughness and resistance to cracking during handling of the demolded composition prior to, during and after heating. The glass fibers partially dissolved, creating air voids that facilitated venting of water vapor during the initial heating step, with sufficient fiber mass remaining to provide the aforementioned increase in toughness and fracture resistance. In addition, the glass fibers provided the refractory composition (i.e., in the shape of a decorative fire log) with a reddish fire-like or coal-like glow during use in a gas fireplace.

Example 4

A fresh cementitious composition was prepared using class C fly ash, sodium citrate dihydrate at 2% by fly ash weight, boric acid at 1.25% by fly ash weight, and water to bring the W/C ratio to 0.20. Multiple aliquots of the composition were removed and mixed with sodium hydroxide at 1% by fly ash weight. Each aliquot was poured into a mold. The molds were stripped after 15 minutes of set time. The resulting hardened cementitious products were at a temperature of 120° F. (49° C.) upon removal from the molds.

Example 5

The hardened cementitious compositions from Example 4 were heated at 400° F. for one hour to remove moisture. A compressive strength test showed that the resulting dried cementitious compositions had a compressive strength of 6,000 psi (41.4 MPa).

Example 6

The dried cementitious compositions from Example 5 were fired at 1,000° F. (538° C.) to 1,500° F. (816° C.) to form refractory compositions. After cooling, the expansion of the refractory composition was measured and it was determined that the refractory composition had expanded by 0.04% relative to pre-firing. The refractory composition s showed no loss in compressive strength.

Example 7

A fire log formed from the fired refractory composition was dropped onto a concrete floor from a distance of about 3 to 4 feet above the concrete floor. No signs of cracking or breakage were present after 10-12 drops.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of manufacturing a refractory composition, comprising:
    preparing a fresh cementitious composition comprising Class C fly ash, an alkali activator, and water;
    shaping the fresh cementitious composition;
    allowing the shaped cementitious composition to harden;
    initially heating the hardened cementitious composition to about 150° C. to 260° C. for a time period of about 30 minutes to 5 hours to remove water to a level that avoids explosive spalling when further heated at a higher temperature, the initial heating forming an at least partially dried cementitious composition; and
    further heating the at least partially dried cementitious composition to about 540° C. to 820° C., without explosive spalling, to at least partially remove any additional water and form the refractory composition.

2. The method of claim 1, further comprising adding a set retardant to the fresh cementitious composition to retard setting and thereafter adding a pH regulator to accelerate setting.

3. The method of claim 2, wherein the set retardant is a weak organic acid or a weak mineral acid selected from the group consisting of citric acid, lactic acid, ascorbic acid, benzoic acid, oxalic acid, acetic acid, propionic acid, boric acid, and carbonic acid.

4. The method of claim 2, wherein the set retardant is included in an amount of about 0.1 to 5% by weight of the fly ash, and wherein the fresh cementitious composition including the set retardant has an extended set time of up to about 3 hours.

5. The method of claim 2, wherein the pH regulator is an alkali metal hydroxide or an alkali metal salt of a weak organic acid selected from the group consisting of sodium hydroxide, potassium hydroxide, sodium ascorbate, potassium ascorbate, sodium carbonate, potassium carbonate, trisodium phosphate, and tripotassium phosphate.

6. The method of claim 2, wherein the pH regulator is included in an amount of about 0.1 to 5% by fly ash weight, and wherein the weight ratio of the set retardant to the alkali activator is about 0.05 to 20.

7. The method of claim 2, wherein the fresh cementitious composition is contacted with the pH regulator prior to positioning the cementitious composition within a mold to shape the cementitious composition.

8. The method of claim 2, wherein the fresh cementitious composition is contacted with the pH regulator upon positioning the cementitious composition in a mold, the mold being pre-treated with the pH regulator.

9. The method of claim 2, wherein an aggregate is pre-treated with the pH regulator and the fresh cementitious composition is contacted with the pH regulator by contacting the cementitious composition and the aggregate.

10. The method of claim 1, wherein the alkali activator is an alkali metal salt of a weak organic acid, and wherein the alkali activator has an alkali metal cation and an anion selected from the group consisting of acetate, citrate, lactate, benzoate, and glycolate.

11. The method of claim 1, wherein the alkali activator is included in an amount of about 0.1 to 10% by weight of the fly ash.

12. The method of claim 1, wherein the fresh cementitious composition further includes polymer fibers, made from at least one polymer selected from the group consisting of polyester, polyethylene, polyvinyl chloride, polypropylene, polystyrene, polyamide, polycarbonate, polyurethane, acrylonitrile butadiene styrene (ABS), cellulose acetate, polyoxymethylene, polymethyl methacrylate, polysulfone, and styrene acrylonitrile.

13. The method of claim 1, wherein the fresh cementitious composition further includes glass fibers, wherein the cementitious composition is formulated with an alkalinity such that the glass fibers partially dissolve during molding and/or heating to form voids or channels that aid in venting of water vapor during heating.

14. The method of claim 1, wherein the cementitious composition is shaped as a brick, block, slab, panel, or fire log.

15. The method of claim 1, wherein the at least partially dried cementitious composition has a compressive strength of about 4,000 to 8,000 psi.

16. A method of manufacturing a concrete fire log, comprising:
    preparing a fresh cementitious composition including Class C fly ash, glass fibers, an aggregate selected from the group consisting of pumice, shale, lightweight expanded shale, perlite, vermiculite, crushed stone, sand, basalt, and metallurgical slag, an alkali activator, and water;
    shaping the fresh cementitious composition in a shape of a fire log;
    allowing the shaped cementitious composition to harden; and
    heating the hardened cementitious composition to remove water and form an at least partially dried concrete fire log,
    wherein the cementitious composition is formulated with an alkalinity such that the glass fibers partially dissolve during molding and/or heating to form voids or channels that aid in venting of water vapor during heating.

17. The method of claim 16, the method comprising further heating the at least partially dried concrete fire log at a higher temperature to at least partially remove any remaining water.

18. The method of claim 16, wherein remaining undissolved glass fibers provide the concrete fire log with a reddish fire-like or coal-like glow when heated by a burner.

19. The method of claim 16, wherein the glass fibers are dispersed within the fresh cementitious composition.

20. A method of manufacturing a refractory composition, comprising:
   mixing Class C fly ash, an alkali activator, glass fibers, and water to form a fresh cementitious composition, wherein the glass fibers are dispersed within the fresh cementitious composition;
   shaping the fresh cementitious composition;
   allowing the shaped cementitious composition to harden; and
   heating the hardened cementitious composition to remove water and form an at least partially dried cementitious composition,
   wherein the cementitious composition is formulated with an alkalinity such that the glass fibers partially dissolve during molding and/or heating to form voids or channels that aid in venting of water vapor during heating.

21. The method of claim 20, wherein remaining undissolved glass fibers provide strength and fracture resistance to the composition.

\* \* \* \* \*